United States Patent Office 3,573,132
Patented Mar. 30, 1971

3,573,132
PROCESS FOR THE PREPARATION OF POLYIMIDES
Maurice Ducloux and Max Gruffaz, Lyon, France, assignors to Rhone-Poulenc S.A., Paris, France
No Drawing. Filed Oct. 30, 1967, Ser. No. 679,163
Int. Cl. C09j 5/00, 7/00
U.S. Cl. 156—306        10 Claims

ABSTRACT OF THE DISCLOSURE

In preparing polyimides, approximately equimolecular quantities of a tetracarboxylic acid dianhydride and a diprimary diamine are mixed with water and deposited on a support. The water is subsequently removed and then the residual mixture or support is heated to 100° to 400° C.

---

This invention relates to the preparation of composite materials containing polyimides.

The reaction of dianhydrides of tetracarboxylic acids with diprimary diamines gives polyimides possessing remarkable chemical, electrical and thermal properties. It has already been proposed (French Pat. No. 1,154,516) to prepare assemblies of fibre glass or woven glass with polypyromellitimides derived from long-chained aliphatic diamines (e.g. nonamethylenediamine, 4,4-dimethylheptamethylenediamine, or 3-methylheptamethylenediamine), the proposed technique consisting in impregnating the glass support with an organic solution of the salt formed by the diamine with an acid pyromellitic diester, evaporating the solvent, then heating the impregnated support at a temperature from 38° to 155° C. to cause the salt to prepolymerise, and finally stacking a predetermined number of elements thus obtained and heating this assembly under pressure at a temperature above the crystalline melting point of the resin formed.

This process is inapplicable when it is desired to prepare assemblies based upon non-thermoplastic polyimides or polyimides whose thermal degradation is already considerable at the temperature at which they soften.

It has also been proposed (French Pat. No. 1,379,219) to prepare moulded articles from polyimides containing particles of abrasive materials, the proposed process comprising the following operations. In a first stage, an intermediate acid polyamide solution is prepared by reacting a diprimary diamine with a dianhydride of a tetracarboxylic acid in an anhydrous polar solvent such as dimethylformamide or dimethylacetamide. A mixture of the acid polyamide thus obtained and of abrasive particles is prepared, this mixture is shaped and finally the acid polyamide is converted into the polyimide by a thermal or chemical treatment. This process has the disadvantage of involving the use of very special polar organic solvents of relatively high boiling point.

A new process has now been found for the preparation of composite materials containing polyimides. This process comprises depositing on a support a mixture of a tetracarboxylic acid dianhydride, a diprimary, diamine and water, removing the water, and then heating the mixture on the support to 100° C. to 400° C. and preferably to 120° C. to 350° C.

The tetracarboxylic acid dianhydrides previously employed for the preparation of polyimides may all be employed in the new process. These dianhydrides may be represented by the formula:

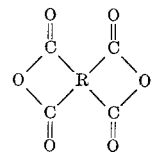

in which the symbol R represents a tetravalent aliphatic, cycloaliphatic, heterocyclic or aromatic radical containing at least 2 carbon atoms. More especially, R may be a straight or branched saturated aliphatic radical of 2 to 4 carbon atoms, a saturated alicyclic radical having 5 or 6 carbon atoms in the ring, a heterocyclic radical containing at least one oxygen, nitrogen, or sulphur atom, a monocyclic or condensed polycyclic aromatic radical or a polycyclic aromatic radical having a number of condensed or uncondensed rings, which are attached to one another by valence bonds or by atoms or groups, for example, oxygen and sulphur atoms, alkylene radicals of 1 to 3 carbon atoms, or a group of formula:

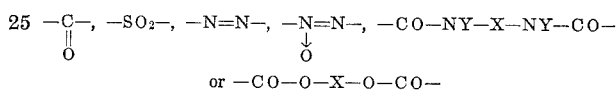

in which X represents a straight or branched alkylene radical having up to 12 carbon atoms, a cycloalkylene radical having 5 or 6 carbon atoms in the ring or a mono- or polycyclic arylene radical, and Y represents an alkyl radical of 1 to 4 carbon atoms or a cycloalkyl or mono-cyclic or condensed polycyclic aromatic radical.

Preferably R is a straight or branched saturated aliphatic radical of 2 to 4 carbon atoms, a saturated cycloaliphatic radical of 5 or 6 carbon atoms, a benzene radical, or a group in which two divalent benzene radicals are linked either directly or via an oxygen atom, an alkylene radical of 1 to 3 carbon atoms, or a group of formula:

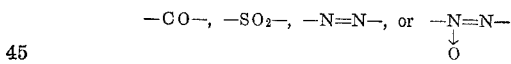

More specifically the dianhydrides of the following acids may be used: pyromellitic acid, naphthalene-2,3,6,7-tetracarboxylic acid, perylene-3,4,9,10 - tetracarboxylic acid, 3,3',4,4'-diphenyl-tetracarboxylic acid, diphenylmethane-3,3',4,4'-tetracarboxylic acid, ethylene-tetracarboxylic acid, cyclopentadienyl-tetracarboxylic acid, 2,2-diphenylpropane-3,3',4,4'-tetracarboxylic acid, diphenylsulphone-3,3',4,4' - tetracarboxylic acid, cyclopentane-tetracarboxylic acid, benzophenone-3,4,3',4'-tetracarboxylic acid, azoxybenzene - 3,3',4,4' - tetracarboxylic acid, azobenzene-3,3',4,4'-tetracarboxylic acid and diphenyl oxide-3,3',4,4'-tetracarboxylic acid.

The diprimary diamines which may be employed may be represented by the formula:

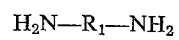

in which $R_1$ represents a divalent aliphatic, cycloaliphatic, heterocyclic or aromatic radical of at least two carbon atoms. More specifically, $R_1$ may be a straight or branched divalent saturated aliphatic radical of 2 to 12 carbon atoms, a saturated divalent cycloaliphatic radical having 5 or 6 carbon atoms in the ring, a heterocyclic radical containing at least one oxygen, nitrogen or sulphur atom, or a monocyclic (benzene) or polycyclic aromatic, radical, it being possible for these various radicals to have in addition substituents which do not give parasitic reactions under the operating conditions. The symbol $R_1$ may also represent a umber of benzene radicals attached either directly or by a divalent atom or group, such as alkylene of 1 to 3 carbon atoms, $$-O-, \; -S-, \; -NR_2-, \; -P(O)R_2-, \; -N=N-, \; -N=N- \atop \downarrow \atop O$$

$$-CONH-, \; -CO-O-, \; -SiR_2R_3-, \; -NY-CO-X-CO-NY-$$

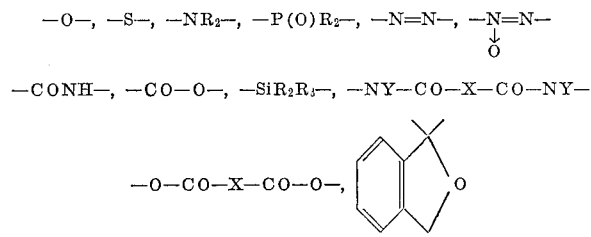

$$-O-CO-X-CO-O-,$$

in which $R_2$, $R_3$ and Y each represent an alkyl radical of 1 to 4 carbon atoms or a condensed cycloalkyl or monocyclic or polycyclic aromatic radical, and X represents a straight or branched divalent alkylene radical having up to 12 carbon atoms, a cycloalkylene radical having 5 or 6 carbon atoms in the ring or a mono- or polycyclic arylene radical. Preferably $R_1$ is a straight or branched divalent saturated aliphatic radical of 2 to 12 carbon atoms, a saturated divalent cycloaliphatic radical of 5 or 6 carbon atoms, a benzene radical, a pyridine radical, or a group in which two benzene nuclei are linked either directly or via an oxygen atom or an alkylene radical of 1 to 3 carbon atoms. Specific diamines which may be employed include 4,4' - diaminodicyclohexylmethane, 1,4-diaminocyclohexane, 2,6 - diaminopyridine, metaphenylenediamine, paraphenylenediamine, 4,4' - diaminodiphenylmethane, 4,4' - diamino - 2,2 - diphenylpropane, benzidine, 4,4' - diaminodiphenyl oxide, 4,4'-diaminodiphenyl sulphide, 4,4' - diaminodiphenylsulphone, bis(4-aminophenyl)diphenylsilane, bis(4-aminophenyl)methylphosphine oxide, bis(3 - aminophenyl)methylphosphine oxide, bis(4-aminophenyl)phenylphosphine oxide, bis(4-aminophenyl)phenylamine, 1,5 - diaminonaphthalene, metaxylylenediamine, paraxylylenediamine and 1,1-bis(paraaminophenyl)phthalane.

Of course, either a single anhydride with a single amine may be employed, or mixtures of reactants of one or both types.

The mixing of the anhydride, the amine and the water may generally take place at ambient temperature (20° to 25° C.) or even below this temperature, the operation being carried out in the absence of air to avoid the formation of oxidation by-products.

Preferably, equimolecular quantities of anhydride and diamine are employed, but a moderate excess of one of the reactants, for example up to 10%, may be accepted without detrimentally affecting the quality of the polyimides prepared by the new process.

The quantity of water employed may vary between fairly wide limits. It should be chosen so as to permit a good distribution of the reactants in the mixture. As a general rule, quantities of water representing from 200% to 500% of the weight of anhydride are quite suitable.

The mixture of the anhydride, the diamine and the water must be as homogeneous as possible. When a water-soluble diamine is employed, the mixture consists of a suspension of dianhydride in the aqueous diamine solution. This suspension may be prepared by conventional means employed in the preparation of dispersions of fine particles of solids in liquids. For example, the operation may be carried out by stirring or grinding. When the amine is insoluble in water, the mixture consists of a suspension of anhydride and diamine in water, and may also be prepared in the manner indicated in the foregoing.

Although these suspensions may be employed as such, it is advantageous to add to the mixture of anhydride, amine and water an aqueous ammoniacal solution before it is deposited on the supports to be assembled. The addition of ammonia to the mixture of anhydride, diamine and water results in the dissolution of the anhydride in the aqueous liquid phase and thus makes it possible to obtain a more homogeneous mixture. Depending upon whether the amine employed is soluble or insoluble in water, the final mixture then consists of an aqueous solution or of a suspension of the amine in the aqueous phase.

The concentration of the ammoniacal solution may vary within fairly wide limits without detrimentally affecting the performance of the process, but it is obviously desirable to employ fairly concentrated solutions such as standard commercial solutions. The quantity of ammonia is preferably chosen so as to ensure complete dissolution of the anhydride in the aqueous phase. It may vary as a function of the amine employed, but as a general rule there is no advantage in employing quantities which introduce more than 4 moles of ammonia per mole of anhydride, it being possible to reduce this quantity by half when the diamine employed is water-soluble at the temperature at which the mixing is carried out.

In practice, the new process may be carried out as follows. The anhydride, the amine, the water and, optionally, the ammonia are mixed by conventional methods, the order in which the reactants are introduced being immaterial. Since the contact of anhydride with ammonia is generally exothermic, the mixture may be cooled to maintain it at the desired temperature. The mixture obtained (solution or suspension) is then deposited on the materials to be assembled and the water is evaporated from the assembly at a temperature which is preferably below 150° C., optionally in vacuo. The desired assembly is then produced and then heated for from several minutes to several hours, at a temperature from 100° C. to 400° C., and preferably from 120° C. to 350° C. This thermal treatment is generally carried out under pressure particularly when the materials to be assembled possess heterogeneous or porous surfaces.

The new process is particularly useful for the production of shaped objects such as laminates or mouldings, and for the bonding of metal parts and porous supports.

The following examples illustrate the invention.

EXAMPLE 1

(a) Into a receptacle previously purged by nitrogen and provided with a stirrer are introduced 550 cc. of water; 54 g. (0.5 mol.) of metaphenylenediamine and 163 g. of the dianhydride of azobenzene-3,3',4,4'-tetracarboxylic acid, and the mixture is homogenised by stirring. 175 cc. of 10 N ammonia are then gradually introduced in 25 minutes. The temperature rises to 50° C. After cooling, a clear solution is obtained.

(b) 130 g. of this solution are intimately mixed with 172 g. of corundum (grain size: 100µ) and the mixture is dried for 20 hours at 120° C. 70 g. of the powder thus obtained are placed in a cylindrical mould (diameter 7.5 cm.), which is heated at 150° C. for 1 hour under a pressure of 122 kg./cm.², and then from 150° to 350° C. in 30 minutes under a pressure of 165 kg./cm.². After cooling and release from the mould, an abrasive disc (thickness: 5.2 mm.; weight 61.3 g.), which has excellent cohesion, is obtained.

(c) Another part of the solution is used to coat a glass fibre fabric, of the satin type, weighing 320 g./m.², which has undergone a thermal de-oiling. After coating, the fabric is dried at 100° C. for 1 hour in a ventilated air oven. The weight of dry matter introduced by the coating represents 25% of the total weight of the coated and dried fabric. After cooling, rectangular specimens (11.2 cm. x 7.5 cm.) are cut from this fabric and stacked to form a 16-ply laminated assembly. This assembly is then compressed under 32.5 kg./cm.$^2$ and heated under this pressure for 30 minutes at 350° C. The laminate obtained after this thermal treatment contains 17.3% by weight of polyimide and has a bending strength of 61.8 kg./mm.$^2$. The laminate is heated at 300° C. for 110 hours. After this treatment, it has retained 66% of its original bending strength.

EXAMPLE 2

The process of the preceding example is repeated, replacing metaphenylene diamine by 2,6-diaminopyridine or by hexamethylenediamine. The following table shows the nature and quantity of the reactants employed, and the properties of the laminates obtained.

| Diamine | 2,6-diamino-pyridine (10.91 g.; 0.1 mol.) | Hexamethylene-diamine (11.83 g.; 0.1 mol.) |
| --- | --- | --- |
| Water (volume in cc.) | 20 | 50 |
| 10 N ammonia (volume in cc.) | 50 | 30 |
| Proportion of solids after drying in the oven (percent by weight) | 26 | 25.5 |
| Proportion of polyimide in the laminate obtained after thermal treatment at 350° C. (percent by weight) | 20.4 | 19 |
| Bending strength of the laminate obtained (kg./mm.$^2$) | 37.2 | 31 |

EXAMPLE 3

A laminated assembly is produced by the procedure of Example 1(c), but using the following reactants: 21 g. (0.1 mol.) of cyclopentane-tetracarboxylic acid dianhydride, 80 cc. of water and 10.81 g. of metaphenylenediamine (0.1 mol.), to which 45 cc. of 10 N ammonia are added in 6 minutes. The laminate obtained has the following characteristics:

proportion of polyimide after thermal treatment—12.3%; bending strength—37.1 kg./mm.$^2$.

EXAMPLE 4

Into a receptacle previously purged with nitrogen and provided with a stirrer are introduced 67.6 g. (0.2 mol.) of azoxybenzene-3,3',4,4'-tetracarboxylic acid dianhydride, 21.62 g. (0.2 mol.) of metaphenylenediamine, and 80 cc. of water, and the mixture is homogenised by stirring. 90 cc. of 10 N ammonia are then introduced in 1 hour, the temperature rising to 39.5° C. A solution is obtained with which is prepared, by the procedure of Example 1(c), a laminate with square pieces (15 cm. x 15 cm.) of glass fibre fabric of the satin type, weighing 320 g./m.$^2$, which has undergone a thermal de-oiling and then a coating with gamma-aminopropyltrialkoxysilane. After drying at 120° C. for 1 hour, the proportion by weight of dry matter in the coated fabric is 25%.

The assembly is shaped by heating at 350° C. for 30 minutes under a pressure of 27 kg./cm.$^2$. A laminate having a bending strength of 69.1 kg./mm.$^2$ and a proportion by weight of polyimide equal to 12% is obtained.

EXAMPLE 5

The process of the preceding example is repeated, starting with 11.27 g. (1/30 mol.) of azoxybenzene-3,3',4,4'-tetracarboxylic acid dianhydride, 25 cc. of water and 15 cc. of 10 N ammonia, the nature of the diamine being varied. The properties of the laminates obtained, and the diamines employed, are shown in the following table.

| Diamine | Hexamethylene-diamine (3.942 g., 1/30 mol.) | 2,6-diaminopyri-dine (3.637 g., 1/30 mol.) | Paraphenylenedia-mine (3.605 g., 1/30 mol.) |
| --- | --- | --- | --- |
| Weight of dry matter in the coated fabric (percent) | 22.6 | 21.8 | 22.2 |
| Weight of polyimide in the laminate (percent) | 18.1 | 15.4 | 17.4 |
| Bending strength of the laminate obtained (kg./mm.$^2$) | 53.8 | 42.1 | 66.9 |
| Bending strength after prolonged heating of the laminate: | | | |
| After 28 hours at 300° C. (kg./mm.$^2$) | | 39.4 | |
| After 72 hours at 300° C. (kg./mm.$^2$) | | 26.1 | |

EXAMPLE 6

(a) 10.37 g. (1/30 mol.) of azobenzene-3,3',4,4'-tetracarboxylic acid dianhydride are dissolved in an aqueous solution obtained from 10 cc. of water and 20 cc. of 10 N ammonia. 6.6 g. (1/30 mol.) of 4,4'-diaminodiphenylmethane are then added, and the mixture is introduced into a ball mill actuated with a reciprocating rectilinear movement. After grinding for 15 minutes, a suspension of very fine solid particles is obtained, with which glass fabric is coated, and a laminate is prepared by the procedure indicated in Example 1(c). After drying at 110° C. for 1 hour, the coated fabric contains 25.3% by weight of solids. It is then heated at 350° C. under 32.5 kg./cm.$^2$ and the laminate obtained contains 14% by weight of polyimide. Its bending strength is 52.1 kg./mm.$^2$.

(b) By replacing 4,4'-diaminodiphenylmethane by 6.13 g. of benzidine and operating under conditions which are identical in other respects to those mentioned under (a), a laminate having a bending strength of 38.2 kg./mm.$^2$ is obtained.

(c) By the procedure described in (a), but replacing azobenzene-3,3',4,4'-tetracarboxylic anhydride by 11.27 g. of the corresponding azoxy derivative, a laminate whose bending strength is 57.7 kg./mm.$^2$ for a proportion of polyimide of 12% by weight is obtained.

EXAMPLE 7

(a) A very fine suspension of 6.61 g. (1/30 mol.) of 4,4'-diaminodiphenylmethane and 11.27 g. (1/30 mol.) of azoxybenzene - 3,3',4,4' - tetracarboxylic acid dianhydride in 30 cc. of water is prepared by the process indicated in Example 6. This suspension is used to coat a glass fibre fabric identical to that employed in Example 4, but not coated with aminopropylsilane, and a laminate is then formed by the procedure described in Example 1(c). After drying at 110° C. for 1 hour, the coated fabric contains 23.2% by weight of solids. It is then heated at 350° C. under 32.5 kg./cm.$^2$, and the laminate obtained contains 20.4% by weight of polyimide. Its bending strength is 55.8 kg./mm.$^2$.

(b) By replacing 4,4'-diaminodiphenylmethane by 3.605 g. of metaphenylenediamine and operating under conditions which are otherwise identical to those mentioned under (a), a laminate having a bending strength of 55.2 kg./mm.$^2$ is obtained.

EXAMPLE 8

Into a 250 cc. receptacle previously purged with nitrogen and provided with a stirrer, 21.85 g. (0.1 mol.) of pyromellitic dianhydride, 10.81 g. (0.1 mol.) of metaphenylenediamine and 50 cc. of water are introduced. The receptacle is then placed in an ice-water bath and 40 cc. of 10 N ammonia are introduced in 15 minutes with stirring, the temperature of the mixture being maintained in the neighborhood of 10° C. The mixture is then allowed to return to 25° C. and is stirred for 1 hour at this temperature. A clear solution is obtained. 64.8 g. of the solution are used to coat a rectangular piece of glass fibre fabric, measuring 30 cm. x 45 cm., identical to that of Example 4. The coated fabric is dried at 25° C. under reduced pressure at 1 mm. Hg for 5 hours. Its solids content is then 15 g. From this fabric 16 rectangular specimens (each 7.5 cm. x 11.2 cm.) are cut and each specimen is then wetted with 0.5 g. of water. The specimens are then stacked and heated for 20 minutes at 125° C. under a low pressure and then for 10 minutes at 125° C. under 32 kg./cm.² and finally for 30 minutes at 350° C. under the same pressure. The laminate obtained has a bending strength of 47 kg./mm.².

We claim:
1. Process for the preparation of a polyimide which comprises depositing on a support a mixture of a tetracarboxylic acid dianhydride, a diprimary diamine, and water, wherein within 10% of equimolecular quantities of the anhydride and the diamine is employed, thereafter removing the water, and then heating the residual mixture on the support to 100° to 400° C.
2. Process according to claim 1 in which the mixture is heated to 120° to 350° C.
3. Process according to claim 1 in which the mixture applied to the support also contains ammonia.
4. Process according to claim 3 in which the proportion of ammonia is 2 moles per mole of anhydride when a water-soluble diamine is used, and 4 moles per mole of anhydride when a water-insoluble diamine is used.
5. Process according to claim 1 in which the tetracarboxylic acid dianhydride is of the formula:

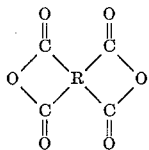

in which R is a straight or branched saturated aliphatic radical of 2 to 4 carbon atoms, a saturated cycloaliphatic radical of 5 or 6 carbon atoms, a benzene radical, or a group in which two divalent benzene radicals are linked eiher directly or via an oxygen atom, an alkylene radical of 1 to 3 carbon atoms, or a group of formula —CO—, —SO₂—, —N=N—, or

6. Process according to claim 5 in which the dianhydride is azobenzene-3,3',4,4'-tetracarboxylic acid dianhydride, cyclopentanetetracarboxylic acid dianhydride, azoxybenzenetetracarboxylic acid dianhydride, or pyromellitic acid dianhydride.
7. Process according to claim 1 in which the diprimary diamine is of the formula:

$$H_2N—R_1—NH_2$$

in which $R_1$ is a straight or branched divalent saturated aliphatic radical of 2 to 12 carbon atoms, a saturated divalent cycloaliphatic radical of 5 or 6 carbon atoms, a benzene radical, a pyridine radical, or a group in which two benzene nuclei are linked either directly or via an oxygen atom or an alkylene radical of 1 to 3 carbon atoms.
8. Process according to claim 7 in which the diamine is metaphenylenediamine, 2,6-diaminopyridine, hexamethylenediamine, paraphenylenediamine, 4,4'-diaminodiphenylmethane, or benzidine.
9. Process according to claim 1 in which the support is a powder, and the powder carrying the mixture is heated under pressure to produce an agglomerate.
10. Process according to claim 1 in which the support is a sheet, and a plurality of sheets carrying the mixture is heated under pressure to produce a laminate.

References Cited
UNITED STATES PATENTS

| | | | |
|---|---|---|---|
| 3,179,631 | 4/1965 | Endrey | 51—298 |
| 3,295,940 | 1/1967 | Gerow | 51—298 |
| 3,312,663 | 4/1967 | Sorenson | 51—298 |
| 3,376,260 | 4/1968 | Fritz | 260—78TF |
| 3,440,197 | 4/1969 | Boldebuck | 51—298 |

ROBERT F. WHITE, Primary Examiner
G. AUVILLE, Assistant Examiner

U.S. Cl. X.R.
156—331; 260—78; 264—117, 136